(12) United States Patent
Liu (10) Patent No.: US 6,880,848 B2
(45) Date of Patent: Apr. 19, 2005

(54) FOLDABLE BICYCLE

(76) Inventor: Yueh-Fen Liu, No. 25, Lane 106, Shan-Hsi-Chung St., Taichung (TW)

( * ) Notice: Subject to any disclaimer, the term of this patent is extended or adjusted under 35 U.S.C. 154(b) by 0 days.

(21) Appl. No.: 10/623,593

(22) Filed: Jul. 22, 2003

(65) Prior Publication Data

US 2005/0017479 A1    Jan. 27, 2005

(51) Int. Cl.⁷ .............................................. B62K 3/02
(52) U.S. Cl. ...................... 280/287; 280/278; 74/551.3
(58) Field of Search ................................. 280/287, 283, 280/284, 275, 278; 74/551.3

(56) References Cited

U.S. PATENT DOCUMENTS

| | | | | |
|---|---|---|---|---|
| 4,634,138 A | * | 1/1987 | Fryer et al. .................. | 280/278 |
| 5,440,948 A | * | 8/1995 | Cheng ........................ | 74/551.3 |
| 5,492,350 A | * | 2/1996 | Pan ............................. | 280/278 |
| 6,170,845 B1 | * | 1/2001 | Tseng ......................... | 280/284 |
| 6,189,908 B1 | * | 2/2001 | Lu .............................. | 280/284 |
| 6,354,618 B1 | * | 3/2002 | Liao ........................... | 280/287 |
| 6,513,823 B1 | * | 2/2003 | Chen .......................... | 280/284 |
| 6,581,492 B1 | * | 6/2003 | Chen ......................... | 74/551.3 |
| 6,637,288 B1 | * | 10/2003 | Chu ........................... | 74/551.3 |
| 6,641,159 B1 | * | 11/2003 | Fan ............................. | 280/278 |

* cited by examiner

Primary Examiner—Lesley D. Morris
Assistant Examiner—Tony Winner
(74) Attorney, Agent, or Firm—Troxell Law Office, PLLC (57) ABSTRACT

A foldable bicycle has a frame, a front fork, a front wheel, a stem, a handlebar, a handlebar positioning device, a seat post, a seat, a rear fork, a rear wheel, a drive assembly, a shock absorber and a rear fork positioning device. The handlebar positioning device is mounted between the front fork and the stem so the stem can be folded toward the frame. The rear fork positioning device is mounted between the shock absorber and the rear fork so the rear fork can be folded toward the frame. Accordingly, the bicycle can be folded to reduce the space for storing or transporting the bicycle, and the structure of a foldable bicycle with a shock absorber is simplified.

5 Claims, 9 Drawing Sheets

FOLDABLE BICYCLE

BACKGROUND OF THE INVENTION

1. Field of the Invention

The present invention relates to a bicycle, and more particularly to a foldable bicycle to save space when storing or transporting the bicycle.

2. Description of Related Art

Bicycles are more and more popular in recent years because of their convenience and ability to provide exercise for a rider. A conventional bicycle substantially comprises a frame, a fork, a front wheel, a stem, a handlebar, a seat, a rear fork, a rear wheel and a drive assembly to rotate the rear wheel. Because a conventional bicycle's structure is well known, a detailed description of the conventional bicycle is omitted. However, the conventional bicycle has a large volume, and a bumper or car-top rack is often used to transport conventional bicycles, so foldable bicycles are provided to solve the problem.

The conventional foldable bicycle has a folding device incorporated into the frame to make the bicycle foldable so less space is required for storing or transporting the bicycle. However, the conventional folding device has a complex structure and complicates the structure of the foldable bicycle. The conventional folding device makes a bicycle with a shock absorber especially complicated and increases the cost of manufacturing the foldable bicycle.

To overcome the shortcomings, the present invention provides a foldable bicycle to mitigate or obviate the aforementioned problems.

SUMMARY OF THE INVENTION

The main objective of the invention is to provide a foldable bicycle that has a simplified structure and can be folded to a minimum volume. The foldable bicycle has a frame, a front fork, a front wheel, a stem, a handlebar, a handlebar positioning device, a seat post, a seat, a rear fork, a rear wheel, a drive assembly, a shock absorber and a rear fork positioning device. The handlebar positioning device is mounted between the front fork and the stem to allow the stem to be folded relative to the frame. The rear fork positioning device is mounted between the shock absorber and the rear fork to allow the rear fork to be folded relative to the frame. With such a structure, the bicycle is foldable to reduce the space for storing or transporting the bicycle, and the structure of the foldable bicycle with a shock absorber is simplified.

Other objectives, advantages and novel features of the invention will become more apparent from the following detailed description when taken in conjunction with the accompanying drawings.

DETAILED DESCRIPTION OF PREFERRED EMBODIMENT

Figure 1:
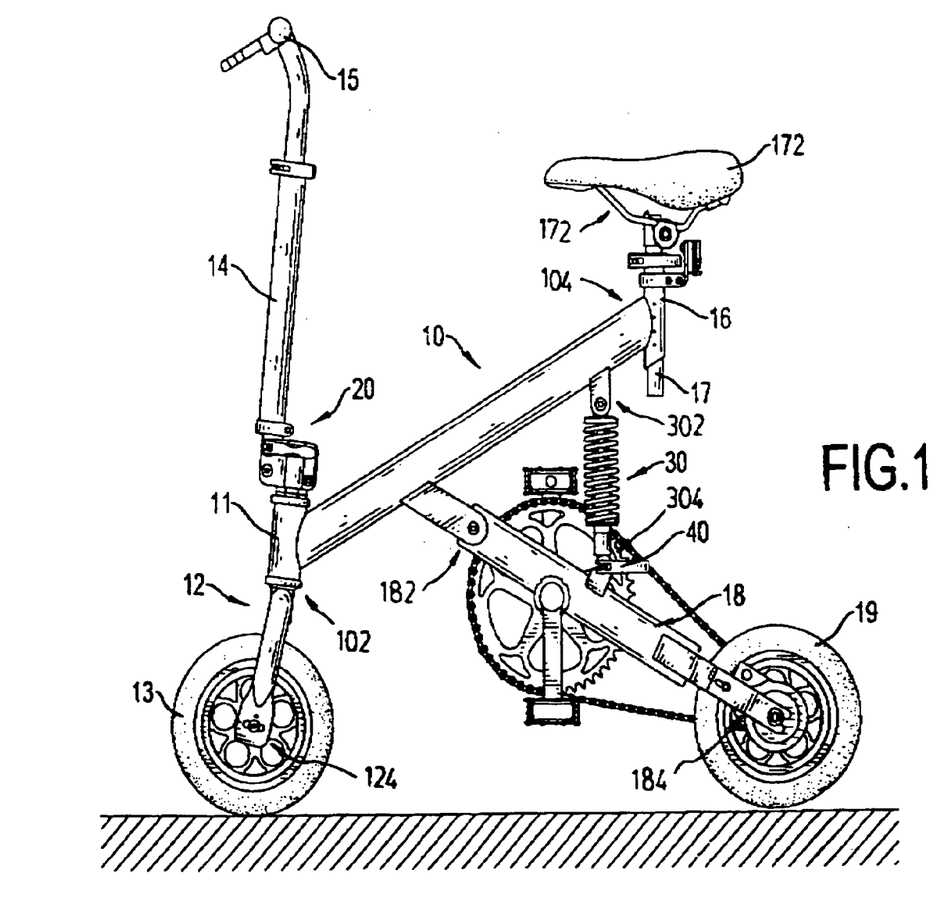
FIG. 1 is a side plan view of a foldable bicycle in accordance with the present invention.

With reference to FIG. 1, a foldable bicycle in accordance with the present invention comprises a frame (10), a front fork (12), a front wheel (13), a stem (14), a handlebar (15), a handlebar positioning device (20), a rear fork (18), a rear wheel (19), a drive assembly, a shock absorber (30), a rear fork positioning device (40), a seat post (17) and a seat (172). The frame (10) has a front end (102), a rear end (104), a head tube (11) and a seat tube (16). The head tube (11) is formed on the front end (102), and the seat tube (16) is formed on the rear end (104).

The front fork (12) has a top end (122), a bottom end (124), a neck and two parallel tines. The neck has a top end and a bottom end, is formed at the top end of the front fork (12) and is mounted rotatably through the head tube (11). The tines respectively have a top end and a bottom end and are formed at the bottom end of the front fork (12) with the top ends connected to the bottom end of the neck.

Figure 9:
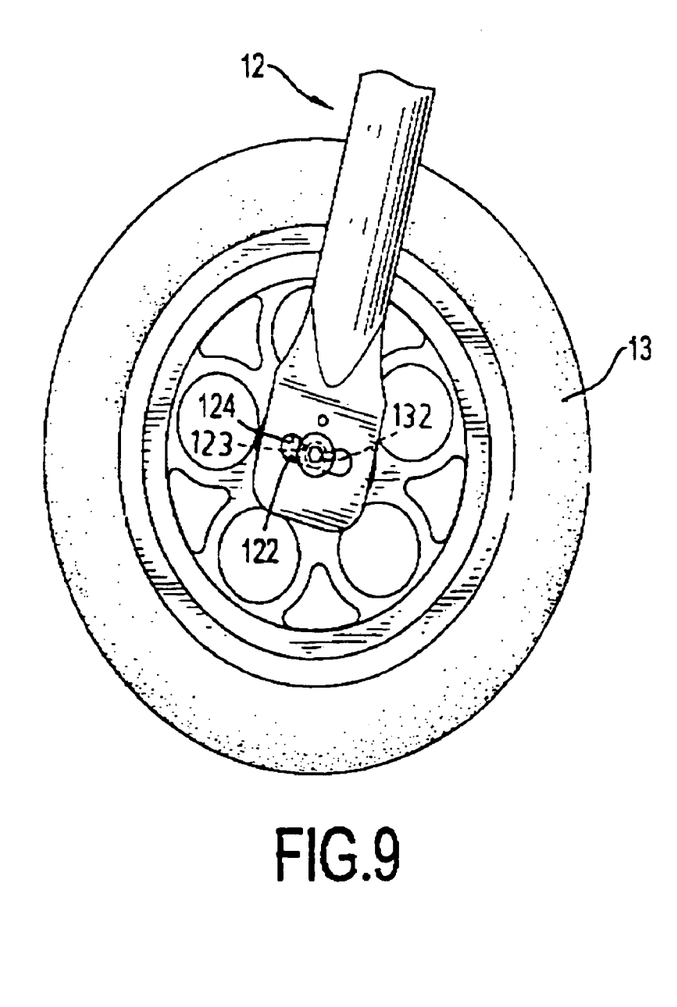
FIG. 9 is an enlarged side plan view of the front fork and the front wheel on the foldable bicycle in FIG. 1.

The front wheel (13) is rotatably mounted at the bottom end of the front fork (12) between the bottom ends of the tines with a front axle (132). With further reference to FIG. 9, a transverse slot (122) having an upper edge (123) and a lower edge is defined through the distal end of each tine of the front fork (12). The front axle extends through the slot (122). Multiple recesses (124) are defined in the upper edge of the transverse slot (122) to selectively mount the front axle. Consequently, the front wheel (13) can be positioned relative to the front fork (12) at different positions to adjust to different riders.

The stem (14) is connected pivotally to the top of the front fork (12) by the handlebar positioning device (20) and has a top and a bottom. The handlebar (150 is transversely mounted near the top of the stem (14).

Figure 2:
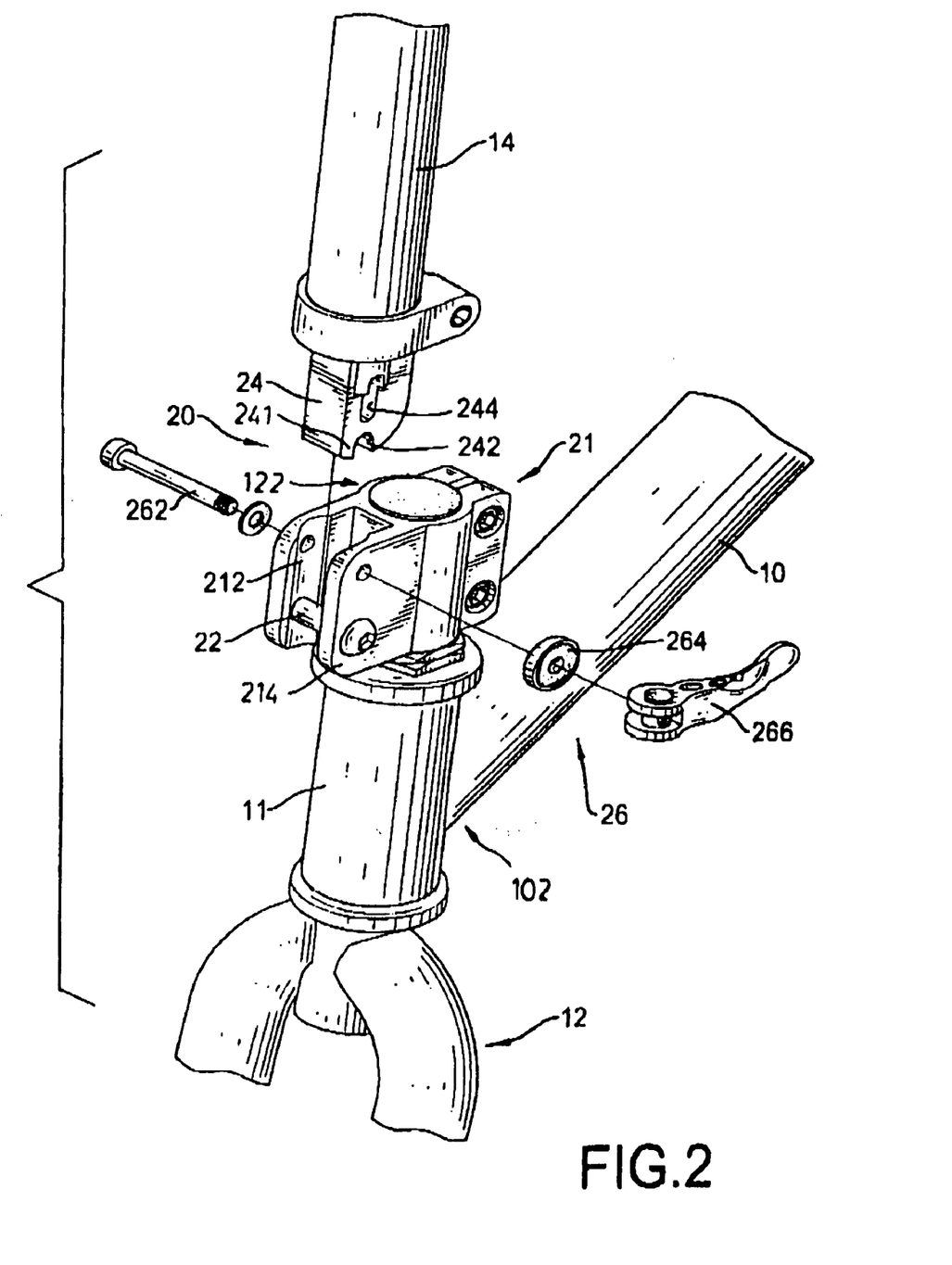
FIG. 2 is an exploded perspective view of a handlebar positioning device on the foldable bicycle in FIG. 1.
Figure 3:
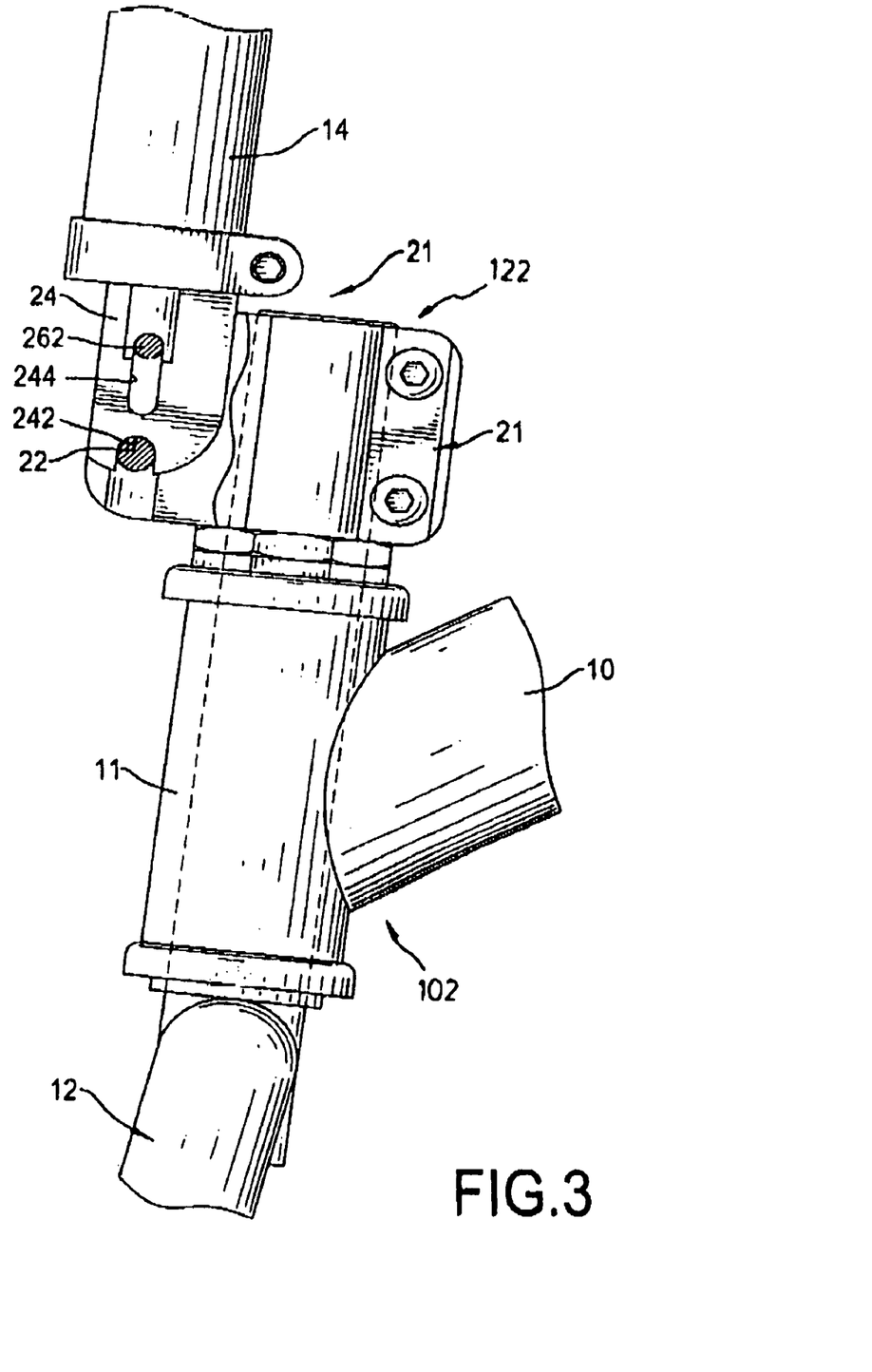
FIG. 3 is an enlarged side plan view in partial section of the handlebar positioning device in FIG. 2.

With further reference to FIGS. 2 and 3, the handlebar positioning device (20) comprises a bracket (21), a locking pin (22), a locking neck (24) and a handlebar quick-release device (26). The bracket (21) is attached to the top of the front fork (12), holds the front fork (12) in the head tube (11) and has an axial through hole, a front longitudinal protrusion and a rear longitudinal protrusion. The front longitudinal protrusion has a longitudinal slot (212) and two wings (214). The wings (214) are formed on opposite sides of the longitudinal slot (212) and extend away from the frame (10). The locking pin (22) is mounted in the longitudinal slot (212) between the wings (214).

The locking neck (24) protrudes from the bottom of the stem (14) and is mounted in the longitudinal slot (212) in the bracket (21). The locking neck (24) has a distal end (241) with a traverse notch (242) corresponding to the locking pin (22) and a longitudinally elongated transverse through hole (244) longitudinally defined through the locking neck (24).

The handlebar quick-release device (26) is mounted on the bracket (21) to squeeze and hold the locking neck (24) between the wings protruding from the bracket (21) and has a compression pin (262), a compression washer (264) and a compression lever (266). The compression pin (262) extends through the wings and the longitudinally elongated transverse through hole (244) in the locking neck (24) and has a threaded distal end. The compression washer (264) is mounted around the compression pin (262) near the thread distal end and abuts one of the wings of the bracket (21). The compression lever (266) has a proximal end, a distal end, an eccentric cam and a rotatable pin. The eccentric cam is formed on the distal end and has a transverse through hole. The pin is rotatably mounted in the transverse through hole and has a threaded transverse through hole. The threaded distal end of the compression pin (262) is screwed into the threaded transverse through hole in the pin, and the eccentric cam abuts the compression washer (264). When the compression lever (266) is rotated and the eccentric cam presses against the compression washer (264), the wings are squeezed together and clamp the locking neck (24). Consequently, the stem (14) will be held securely in place relative to the front fork (12).

Figure 4:
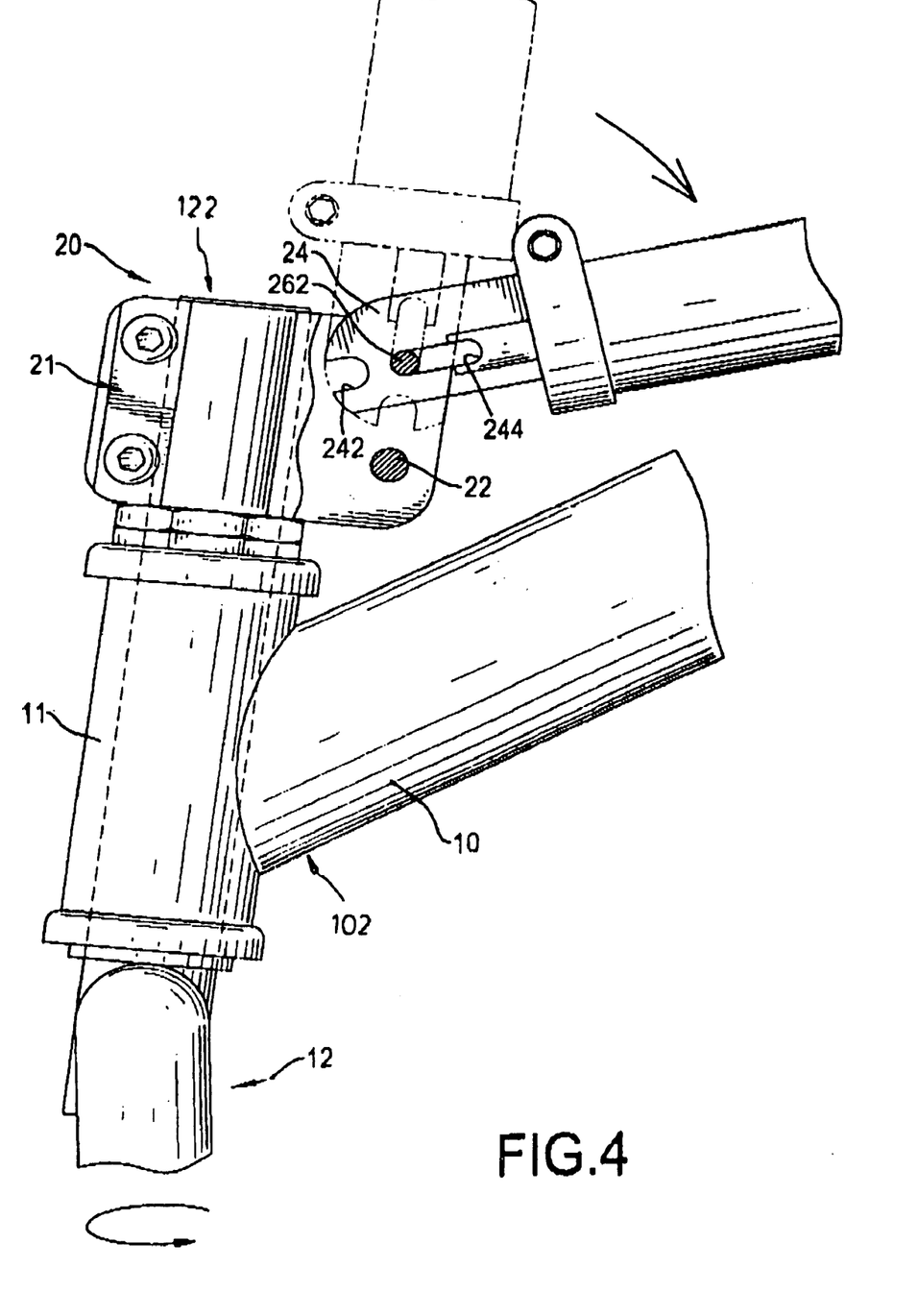
FIG. 4 is an operational side plan view in partial section of the handlebar positioning device in FIG. 3.
Figure 7:
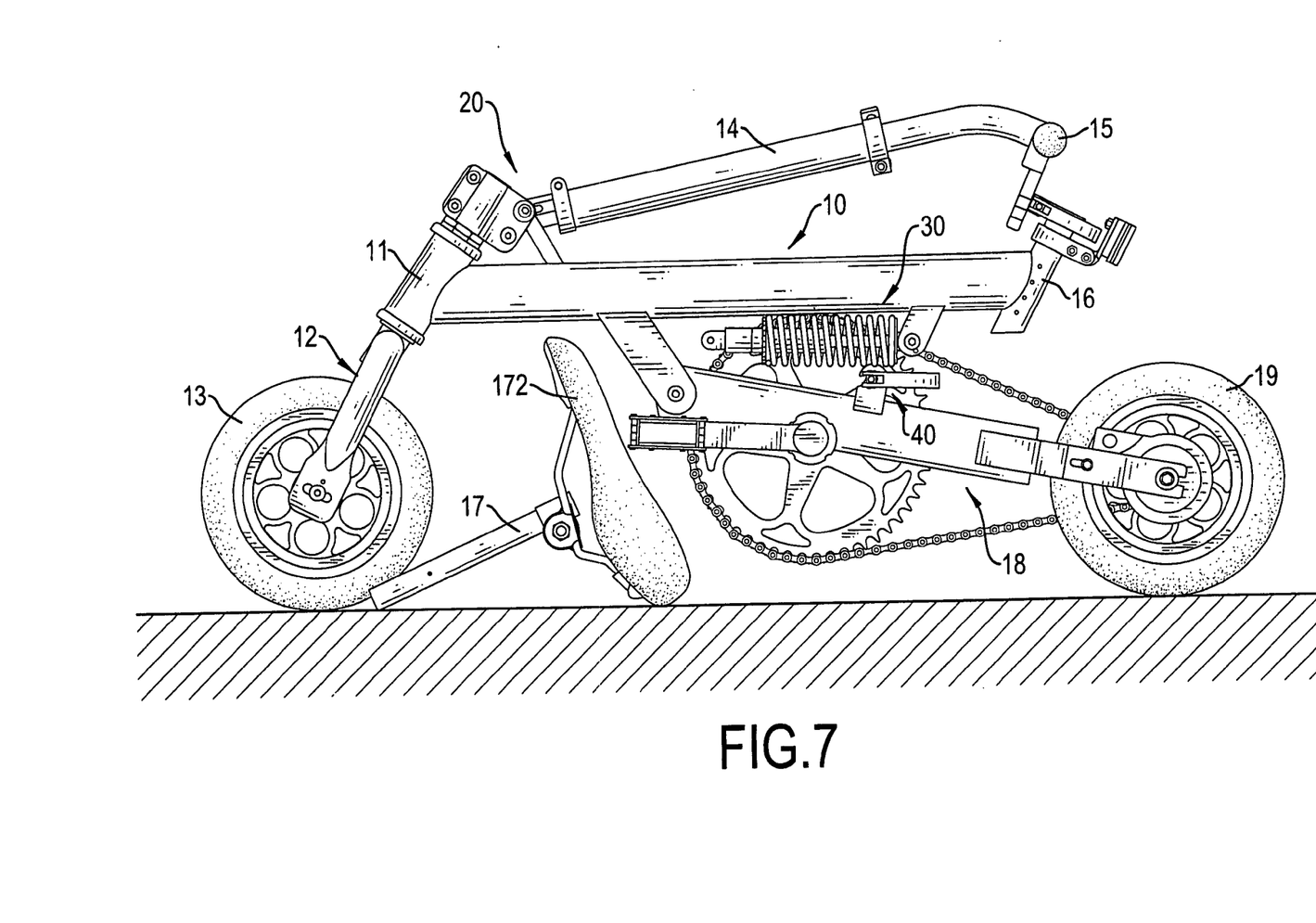
FIG. 7 is a side plan view of the foldable bicycle in FIG. 1 with the bicycle folded.

With reference to FIGS. 1, 4 and 7, when the compression lever (266) is pivoted to a position where the eccentric cam does not abut the compression washer (264), the wings previously clamping the locking neck (24) will be released. The stem (14) and the locking neck (24) can be moved upward along the longitudinally elongated transverse through hole (244) relative to the longitudinal slot (212) in the bracket (21), and the transverse notch (242) will be released from the locking pin (22). The front fork (12) is rotated in the head tube (11) until the longitudinal slot (212) in the bracket (21) faces the frame (10). Then, the stem (14) can be pivoted relative to the bracket (21) at the compression pin (262) toward the frame (10). Accordingly, the bicycle stem (14) and handlebar (15) are folded to reduce the space required for storing or transporting the bicycle.

In an alternative embodiment, the longitudinal slot (212) is defined in the bracket (21) faces the frame (10). With such an arrangement, the stem (14) can be folded toward the frame (10) without rotating the front fork (12).

Figure 5:
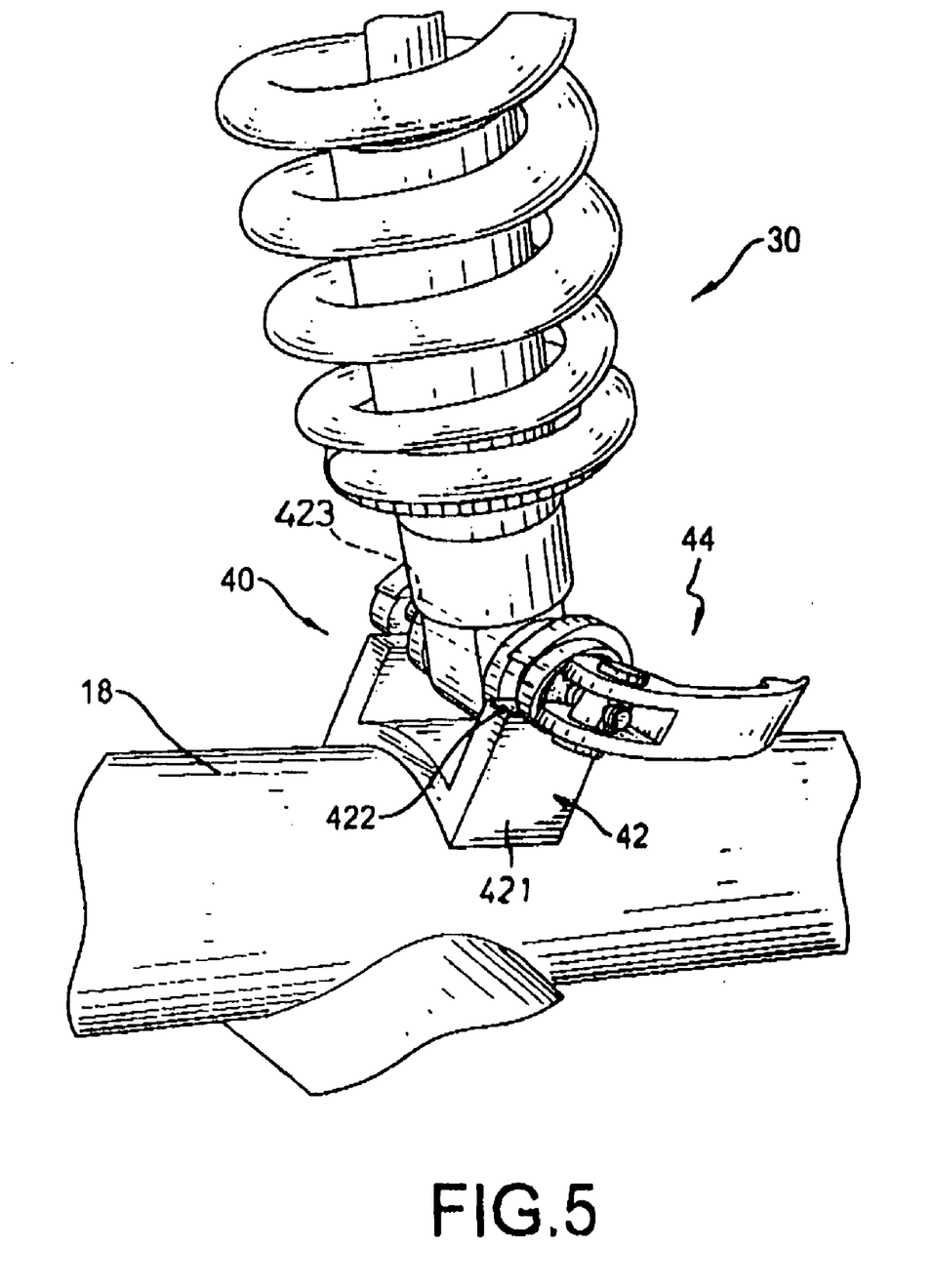
FIG. 5 is an enlarged perspective view of a rear fork positioning device on the foldable bicycle in FIG. 1.

With reference to FIGS. 1 and 5, the rear fork (18) is pivotally attached to the frame (10) and has a proximal end (182) and a distal end (184). The proximal end (182) of the rear fork (18) is pivotally attached to the frame (10), and the rear wheel (19) is rotatably mounted on the distal end (184) of the rear fork (18). The drive assembly is mounted between the rear fork (18) and the rear wheel (19) to rotate the rear wheel (19). The drive assembly substantially comprises two pedal assembled, a front sprocket, a rear sprocket and a chain. The drive assembly is conventional and is not further described.

The shock absorber (30) is mounted between the frame (10) and the rear fork (18) and has a proximal end (302) pivotally attached to the frame (10) and a distal end (304) connected to the rear fork 918) with the rear fork positioning device (40). The rear fork positioning device (40) comprises a U-shaped bracket (42) and a shock absorber quick-release device (44). The U-shaped bracket (42) is securely attached to the rear fork (18) and has two sides (421), two through holes (423) and two notches (422). The distal end of the shock absorber (30) is mounted between the two sides of the bracket (42). The through holes (423) are defined respectively in the sides of the bracket (42). The slots (422) are defined respectively in the sides of the bracket (42) and communicate with the through holes (423).

The shock absorber quick-release device (44) is mounted on the bracket (420 to selectively connect the distal end of the shock absorber (30) to the bracket (42). The shock absorber quick-release device (44) has a structure and operates the same as the handlebar quick-release device (26) and has a compression pin, a compression washer and a compression lever. The compression pin extend through the through holes (423) in the sides of the bracket (42) and the distal end of the shock absorber (30) and has a threaded distal end. The compression washer is mounted around the compression pin near the threaded distal end and abuts one of the sides of the bracket (42). The compression lever has a proximal end, a distal end, an eccentric cam and a rotatable pin. The eccentric cam is formed on the distal end and has a transverse through hole. The pin is rotatably mounted in the transverse through hole and has a threaded transverse through hole. The threaded distal end of the compression pin is screwed into the threaded transverse through hole in the pin, and the eccentric cam abuts the compression washer.

When the compression lever is rotated and the eccentric cam presses against the compression washer, the sides of the bracket (42) are squeezed together and clamp the distal end of the shock absorber (30). Consequently, the distal end of the shock absorber (30) will be securely connected to the rear fork (18).

With further reference to FIG. 7, when the compression lever is pivoted to a position where the eccentric cam does not abut the compression washer, the sides of the bracket (42) previously clamping the distal end of the shock absorber (30) will be released. The proximal end of the shock absorber (30) can be pivoted toward the frame (10) after the compression pin in the shock absorber quick-release device (44) is removed from the slots (422) in the sides of the bracket (42). With the shock absorber (30) pivoted close to the frame (10), the rear fork (18) and the rear wheel (19) with the drive assembly can be pivoted toward the frame (10). Accordingly, the rear fork of the bicycle can be folded to further reduce the space for storing or transporting the bicycle.

Figure 6:
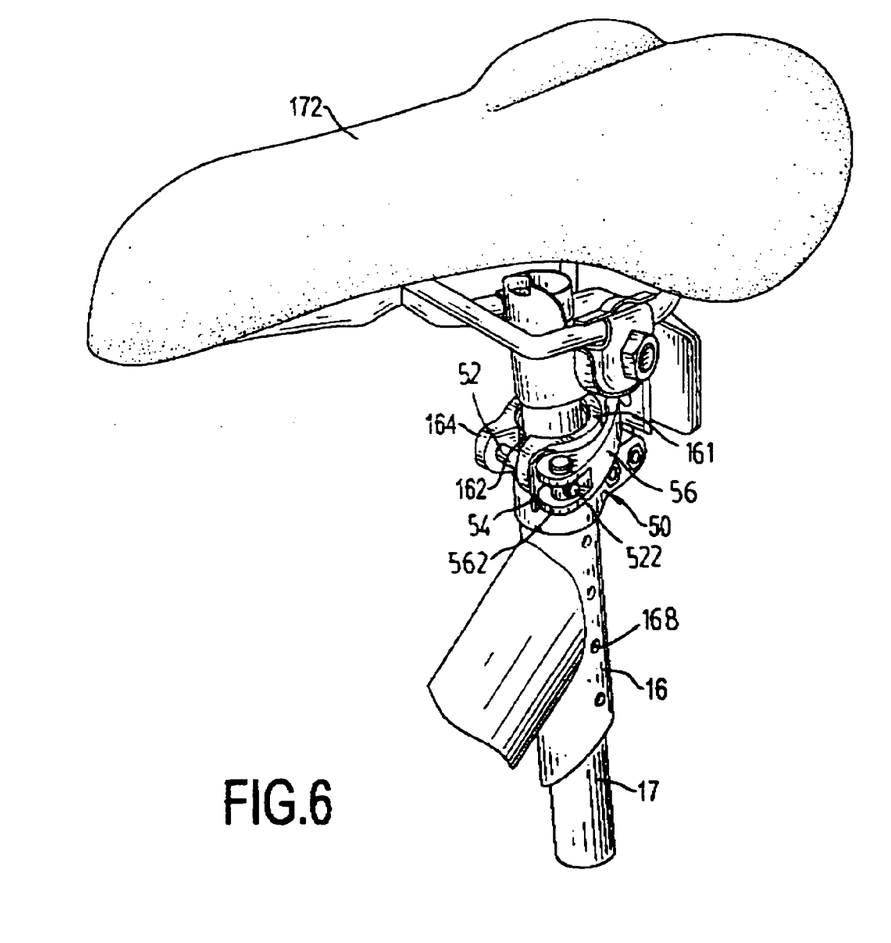
FIG. 6 is an enlarged perspective view of a seat, seat post and seat tube on the foldable bicycle in FIG. 1.

With reference to FIGS. 1 and 6, the seat post (17) extends through and is detachable mounted in the seat tube (16) and has a top (172). The seat (172) is mounted on the top of the seat post (17). To selectively mount the seat post (17) in the seat tube (16), the seat tube (16) has a top (161), a slit (162), two ears (164) and a seat quick-release device (50). The slit (162) has two sides longitudinally defined in the top of the seat tube (16). The two ears (164) are formed at the top of the seat tube (16) and respectively at the two sides of the slit (162). The seat quick-release device (50) is mounted on the seat tube (16) to securely hold the seat post (17) in the seat tube (16). The seat quick-release device (50) has a structure and operates the same as the handlebar and shock absorber quick-release devices (26, 44) and comprises a compression pin (52), a compression washer (54) and a compression lever (56). The compression pin (52) extends through the ears (164) on the seat tube (16) and has a threaded distal end. The compression washer (54) is mounted around the compression pin (52) near the threaded distal end and abuts one of the ears (164) on the seat tube (16). The compression lever (56) has a proximal end, a distal end (522), an eccentric cam (562) and a rotatable pin. The eccentric cam is formed on the distal end and has a transverse through hole. The pin is rotatably mounted in the transverse through hole and has a threaded transverse through hole. The threaded distal end (522) of the compression pin (52) is screwed into the threaded transverse through hole in the pin, and the eccentric cam (562) abuts the compression washer (54).

When the compression lever (56) is rotated and the eccentric cam (562) presses against the compression washer (54), the ears (164) on the seat tube (16) are squeezed together to narrow the slit (162) and clamp the seat post (17).

Consequently, the seat post (17) will be securely held in the seat tube (16) at a desired height.

With further reference to FIG. 7, when the compression lever (56) is pivoted to a position where the eccentric cam (562) does not abut the compression washer (54), the ears (164) on the seat tube (16) will be released, and the seat post (17) will be released. The seat post (17) with the seat (172) can be removed from the seat tube (16) to allow the stem (14) to fold closer to the frame (10) to further reduce the volume of the folded bicycle.

With such folding features, the structure of a bicycle with a shock absorber (30) is simplified, and the cost for manufacturing a foldable bicycle will be reduced.

Figure 8:
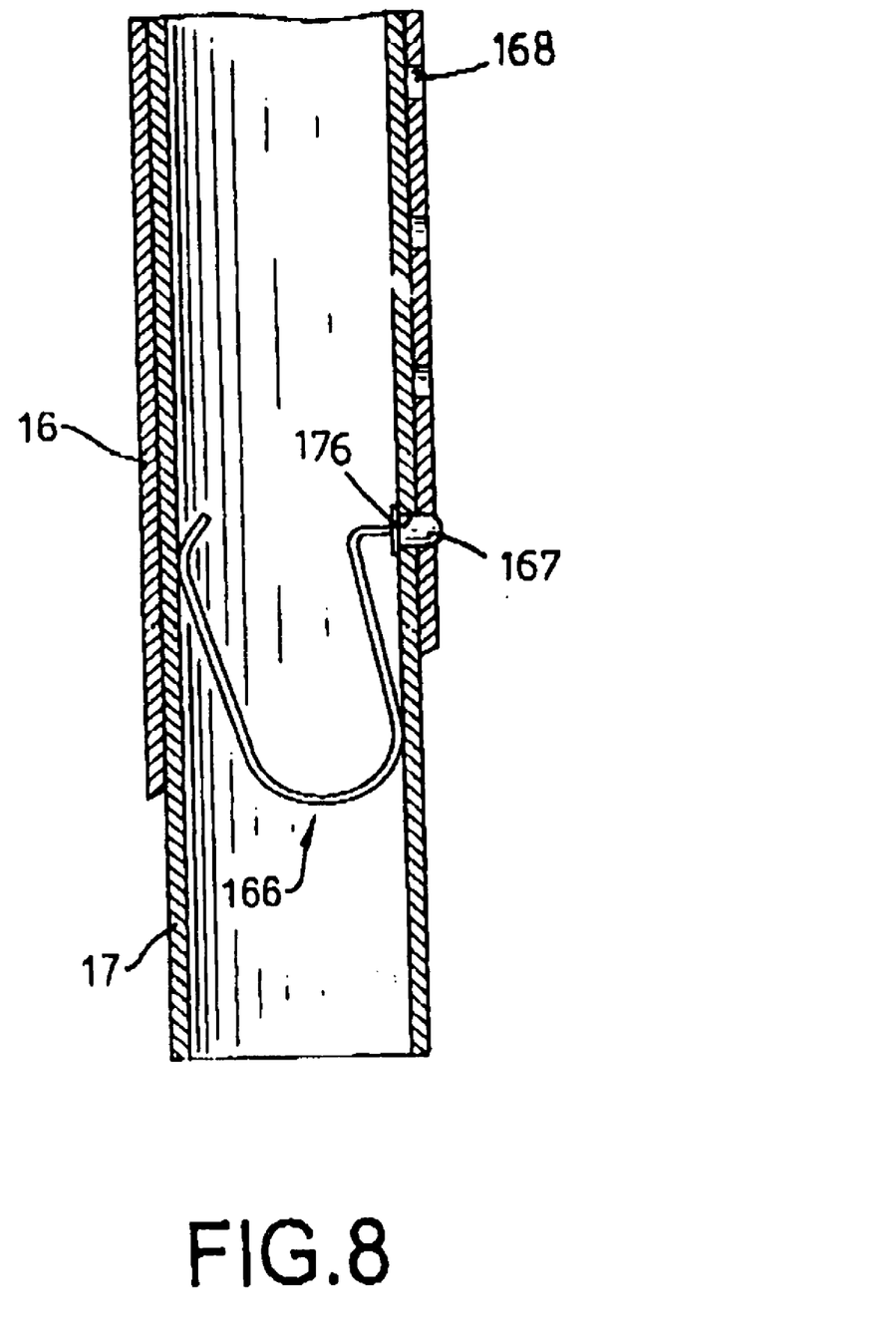
FIG. 8 is an enlarged side plan view in partial section of a seat positioning device mounted between the seat post and the seat tube in the foldable bicycle in FIG. 1.

With reference to FIGS. 1 and 8, an optional embodiment of the seat tube (16) and seat post (17) has multiple positioning holes (168) defined longitudinally through the seat tube (16) and a single through hole (176) defined through the seat post (17). The single through hole (176) in the seat post (17) selectively corresponds to any one of the positioning holes (168) in the seat tube (16). A lock (166) is mounted inside the seat post (17), is a resilient U-shaped element and has an end with a knob (167) extending through the through hole (176) in the seat post (17) and into a corresponding positioning hole (168) in the seat tube (16). When the knob on the lock (166) is seated in a through hole in the seat tube (16), the seat post (17) will be held at a desired vertical position and be kept from rotating in the seat tube (16).

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A foldable bicycle comprising:
    a frame having a front end, a rear end, a head tube formed on the front end and a seat tube formed on the rear end;
    a front fork rotatably extending through the head tube and having a top and a bottom;
    a front wheel rotatable mounted on the bottom of the front fork by a front axle;
    a seat post extending through the seat tube and having a top with a seat;
    a rear fork having a proximal end pivotally attached to the frame and a rear end;
    a rear wheel rotatably mounted on the distal end of the rear fork;
    a drive assembly mounted between the rear fork and the rear wheel to rotate the rear wheel;
    a stem connected to the top of the front fork with a handlebar positioning device and having a bottom, the handlebar positioning device comprising:
        a bracket mounted on the top of the front fork and having a side and a longitudinal slot defined in the side of the bracket to form two wings on the side of the bracket;
        a locking pin mounted between the wings;
        a locking neck protruding from the bottom of the stem, mounted in the longitudinal slot in the bracket and having a distal end with a notch to selectively hold the locking pin and a longitudinally elongated transverse through hole longitudinally defined through the locking neck; and
        a handlebar quick-release device mounted on the bracket to hold the locking neck in the bracket and having:
            a compression pin extending through the wings and the longitudinally elongated transverse through hole in the locking neck and having a threaded distal end;
            a compression washer mounted around the compression pin near the thread distal end and abutting one of the wings of the bracket; and
            a compression lever attached to the threaded distal end of the compression pin and having an eccentric cam abutting the compression washer;
    a handlebar transversely mounted on the stem; and
    a shock absorber mounted between the frame and the rear fork and having a proximal end pivotally attached to the frame and a distal end connected to the rear fork by a rear fork positioning device, and the rear fork positioning device comprising:
        a U-shaped bracket securely attached to the rear fork and having
            two sides to hold the distal end of the shock absorber between the two sides;
            two through holes defined respectively in the two sides of the bracket; and
            two notches defined respectively in the sides of the bracket and communicating with a corresponding one of the through holes; and
        a shock absorber quick-release device mounted on the bracket to hold the distal end of the shock absorber in the bracket and having:
            a compression pin extending through the through holes in the sides of the bracket and the distal end of the shock absorber and having a threaded distal end;
            a compression washer mounted around the compression pin near the threaded distal end and abutting one of the sides of the bracket; and
            a compression lever attached to the threaded distal end of the compression pin and having an eccentric cam abutting the compression washer.

2. The bicycle as claimed in claim 1, wherein the seat post is detachably mounted in the seat tube;
    the seat tube has a top and a slit with two sides longitudinally defined in the top of the seat tube;
    two ears are formed on the top of the seat tube and are respectively at the two sides of the slit; and
    a seat quick-release device are mounted on the seat tube to securely hold the seat post in the seat tube, and the seat quick-release device comprises
        a compression pin extending through the ears on the seat tube and having a threaded distal end;
        a compression washer mounted around the compression pin near the threaded distal end and abutting one of the ears of the seat tube; and
        a compression lever attached to the threaded distal end of the compression pin and having an eccentric cam abutting the compression washer.

3. The bicycle as claimed in claim 2 further comprising multiple positioning holes defined longitudinally through the seat tube;
    a single through hole defined through the seat post and selectively corresponding to any one of the positioning holes in the seat tube; and a lock mounted inside the seat post and having an end with a knob extending through the single through hole in the seat post and into a corresponding positioning hole in the seat tube.

4. The bicycle as claimed in claim 1, wherein the longitudinal slot in the handlebar positioning device is defined in a side of the bracket away from the frame.

5. The bicycle as claimed in claim 1, wherein the front fork has a transverse slot with an upper edge defined through the bottom of the front fork through which the front axle extends; and multiple recesses are defined in the upper edge of the transverse slot to selectively hold the front axle.

\* \* \* \* \*